United States Patent
Mori

[11] Patent Number: 6,138,332
[45] Date of Patent: Oct. 31, 2000

[54] SWITCH FOR A BUCKLE, BUCKLE, AND METHOD OF MANUFACTURING A BUCKLE

[75] Inventor: Shinji Mori, Aichi-ken, Japan

[73] Assignee: Kabushiki Kaisha Tokai-Rika-Denki-Seisakusho, Aichi-ken, Japan

[21] Appl. No.: 09/330,019

[22] Filed: Jun. 11, 1999

[30] Foreign Application Priority Data

Jun. 17, 1998 [JP] Japan .................................. 10-169940

[51] Int. Cl.[7] ............................. A44B 11/00; H01H 3/00; H01H 3/18
[52] U.S. Cl. ............................................. 24/633; 180/268
[58] Field of Search ............................. 24/633, 196, 625, 24/602, 603, 637, 664, 665; 200/295, 61.59; 180/268

[56] References Cited

U.S. PATENT DOCUMENTS

| 4,001,532 | 1/1977 | Kubota et al. . |
| 4,608,469 | 8/1986 | Doty . |
| 4,785,906 | 11/1988 | Kang . |
| 4,916,780 | 4/1990 | Ballet . |
| 5,023,413 | 6/1991 | Staples ................................ 200/295 X |
| 5,133,425 | 7/1992 | Han . |
| 5,752,299 | 5/1998 | Vivacqua et al. .......................... 24/633 |
| 5,758,393 | 6/1998 | Wier ........................................... 24/633 |
| 5,898,366 | 4/1999 | Brown et al. .......................... 24/633 X |

FOREIGN PATENT DOCUMENTS

| 0 318 031 | 5/1989 | European Pat. Off. . |
| 43 38 485 A1 | 5/1995 | Germany . |

*Primary Examiner*—Anthony Knight
*Assistant Examiner*—Robert J. Sandy
*Attorney, Agent, or Firm*—Nixon Peabody LLP; Thomas W. Cole

[57] ABSTRACT

Wing portions of a slider forming a switch are elastically extended outwardly and inserted between an upper plate and a lower plate of a tongue plate in a state in which a cover is attached to a buckle main body. Therefore, the switch can be inserted into the cover through clearances and attached to the tongue plate.

20 Claims, 7 Drawing Sheets

SWITCH FOR A BUCKLE, BUCKLE, AND METHOD OF MANUFACTURING A BUCKLE

BACKGROUND OF THE INVENTION

1. Field of the Invention

The present invention relates to a switch for a buckle, a buckle, and a method of manufacturing a buckle.

2. Description of the Related Art

Among conventional buckles, there is a type of buckle wherein when a tongue plate is inserted thereinto, a switch provided within the buckle is turned on and a state in which the tongue plate is inserted can be detected.

In this type of buckle, a protruding piece protrudes from a slider which forms a switch and is inserted into an anchor plate through a long hole formed thereat. When the tongue plate is inserted into the anchor plate, the protruding piece is pressed via a separate member such as an ejector or the like and the slider slides. Then, the switch is turned on due to the sliding of this slider.

However, in a case of the structure in which the protruding piece of the slider is inserted into the anchor plate, after the buckle main body is assembled (i.e., after components for the buckle are assembled at the anchor plate and a cover is attached thereto), the protruding piece becomes an obstacle and the slider cannot be attached to the buckle main body. Accordingly, the slider is first attached to the anchor plate, the components for the buckle are assembled next, and the cover is attached last. The number of manufacturing processes thereby increases.

Further, because the slider is attached to the buckle main body in the middle of the manufacturing process of the buckle, completely different manufacturing devices (manufacturing lines) are required for a buckle with a switch and a buckle without a switch. Therefore, there is the concern that the cost of manufacturing will increase.

SUMMARY OF THE INVENTION

With the aforementioned in view, an object of the present invention is to obtain a buckle with a switch that can be manufactured with a reduced number of manufacturing processes and at a low cost, a method of manufacturing this buckle, and a switch for a buckle which is used in this buckle.

A first aspect of the present invention is a switch for a buckle which is disposed at a buckle main body and which is turned on when a tongue plate is inserted into the buckle, comprising: a switch main body; and an elastic portion which is provided at the switch main body and which, due to elastic deformation, allows insertion of the switch main body into the buckle through clearances formed between the buckle main body and a cover body attached to the buckle main body.

Accordingly, when the elastic portion provided at the switch main body is elastically deformed, the switch main body is inserted through the clearances formed between the buckle main body and the cover body and the switch can be attached to the buckle main body.

In this way, due to the elastic deformation of the elastic portion, the switch for a buckle can be easily attached to the buckle main body even after the buckle main body is manufactured. Thus, the number of manufacturing processes of the buckle is reduced and the buckle can be manufactured at a low cost.

Further, since the switch for a buckle is attached to the buckle main body after the buckle main body is manufactured, a device for manufacturing the buckle main body can be used in common. Therefore, the cost of manufacturing a buckle can be reduced even further.

A second aspect of the present invention is a buckle, comprising: a buckle main body into which a tongue plate can be inserted, the buckle main body engaging with the inserted tongue plate and preventing removal of the tongue plate; a cover body that is attached to the buckle main body and covers at least a portion of the buckle main body; a switch main body that is disposed at the buckle main body and is turned on when the tongue plate is inserted into the buckle main body; and an elastic portion which is provided at the switch main body and which, due to elastic deformation, allows insertion of the switch main body into the buckle from clearances formed between the buckle main body and the cover body.

Namely, the switch main body can be inserted into the buckle through the clearances formed between the buckle main body and the cover body by elastically deforming the elastic portion. As a result, even after the buckle components are assembled to a supporting plate and the cover body is attached thereto, the switch main body can be attached to the buckle main body. In this way, the number of manufacturing processes of the buckle is reduced and the buckle can be manufactured at a low cost.

Further, because the switch is attached to the buckle main body after the buckle main body is assembled, a device for manufacturing the buckle main body is the same as a device for manufacturing a buckle without a switch, and the cost of manufacturing is reduced.

A third aspect of the present invention is a switch for a buckle according to the first and second aspects, wherein, when the switch main body is inserted into the buckle, the elastic portion elastically returns to the original shape at a position at which the elastic portion is pressed by the tongue plate.

Accordingly, when the switch main body is inserted into the buckle, the elastic portion elastically returns to the original shape at the position at which the elastic portion is pressed by the tongue plate. Thus, when the tongue plate is inserted, the elastic portion is pressed. In this way, the switch main body is turned on.

A fourth aspect of the present invention is a method of manufacturing a buckle, comprising: a buckle main body assembling step in which, on a supporting plate into which a tongue plate can be inserted, buckle components which engage with the inserted tongue plate and prevent removal of the tongue plate are attached and a buckle main body is assembled; a cover body attaching step in which a cover body that covers the buckle components is attached onto the supporting plate; and a switch attaching step in which a switch for a buckle having at least a portion that can be elastically deformed is elastically deformed and inserted through clearances formed between the supporting plate and the cover body and in which the switch is attached to the supporting plate.

In the buckle main body assembling step, the buckle components are attached onto the supporting plate. Consequently, during the manufacture of the buckle, when the tongue plate is inserted into the supporting plate, the buckle components engage with the tongue plate and can prevent removal of the tongue plate.

Next, when the cover body is attached to the supporting plate in the cover body attaching step, the outer appearance improves due to the fact that the buckle components are covered and the buckle can be attached to a vehicle or the like and used.

Lastly, in the switch attaching step, at least a portion of the switch for a buckle is elastically deformed and inserted through the clearances formed between the buckle main body and the cover body and is then attached to the supporting plate. In this way, the switch for a buckle is turned on by the tongue plate, which is inserted into the supporting plate, and the buckle can detect the insertion of the tongue plate.

Since the switch for a buckle is attached in the last switch attaching step, compared to a method of manufacturing a buckle at which a switch is not provided, only the switch attaching step is added. Thus, the number of manufacturing processes is not increased more than necessary and the buckle with a switch can be manufactured at a low cost. Moreover, before the switch attaching step, the process of manufacturing a buckle is the same as the process of manufacturing a buckle at which the switch is not provided. Accordingly, whether the switch is provided at the buckle or not, a device for manufacturing a buckle main body (manufacturing line) can be used in common and the cost of manufacturing does not increase.

DESCRIPTION OF THE PREFERRED EMBODIMENT

Figure 1:
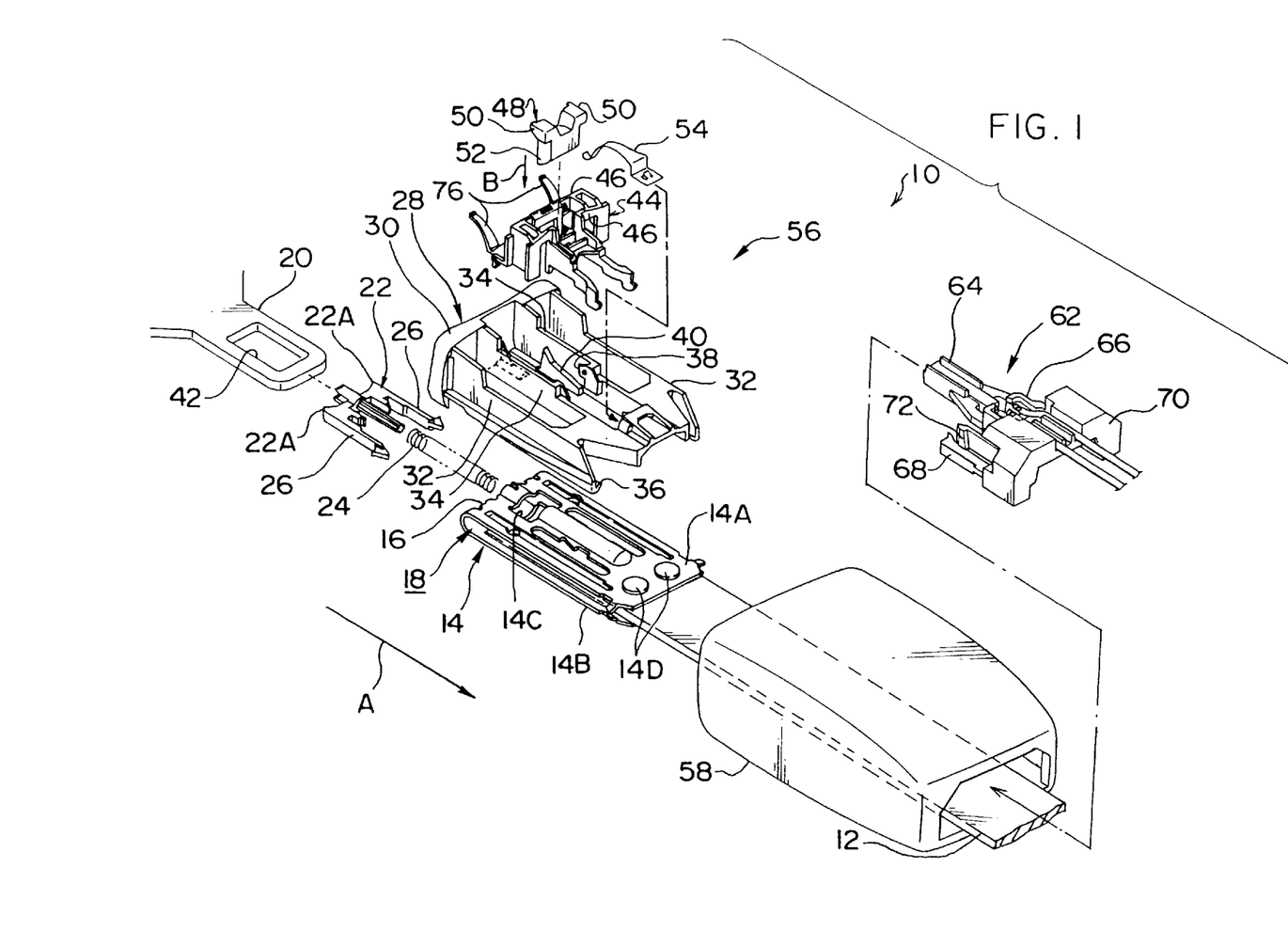
FIG. 1 is an exploded perspective view that shows a buckle according to an embodiment of the present invention.
Figure 2:
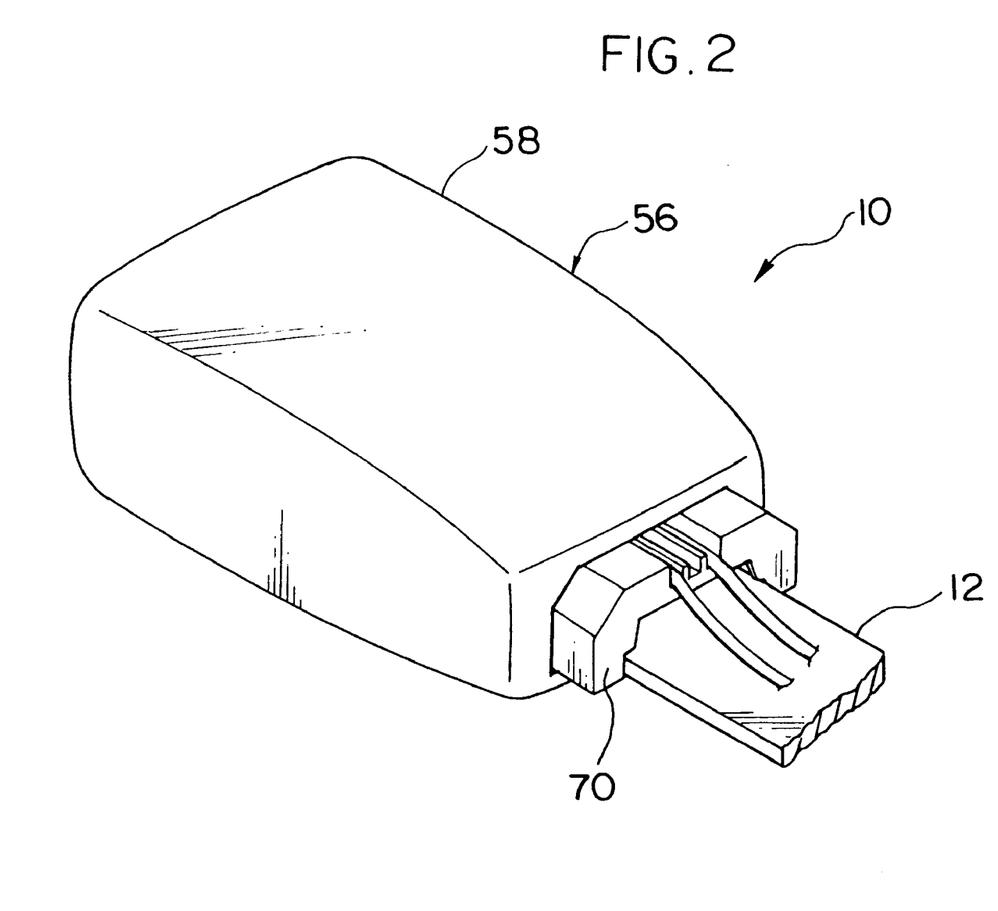
FIG. 2 is a perspective view that shows the buckle according to the present embodiment.
Figure 3:
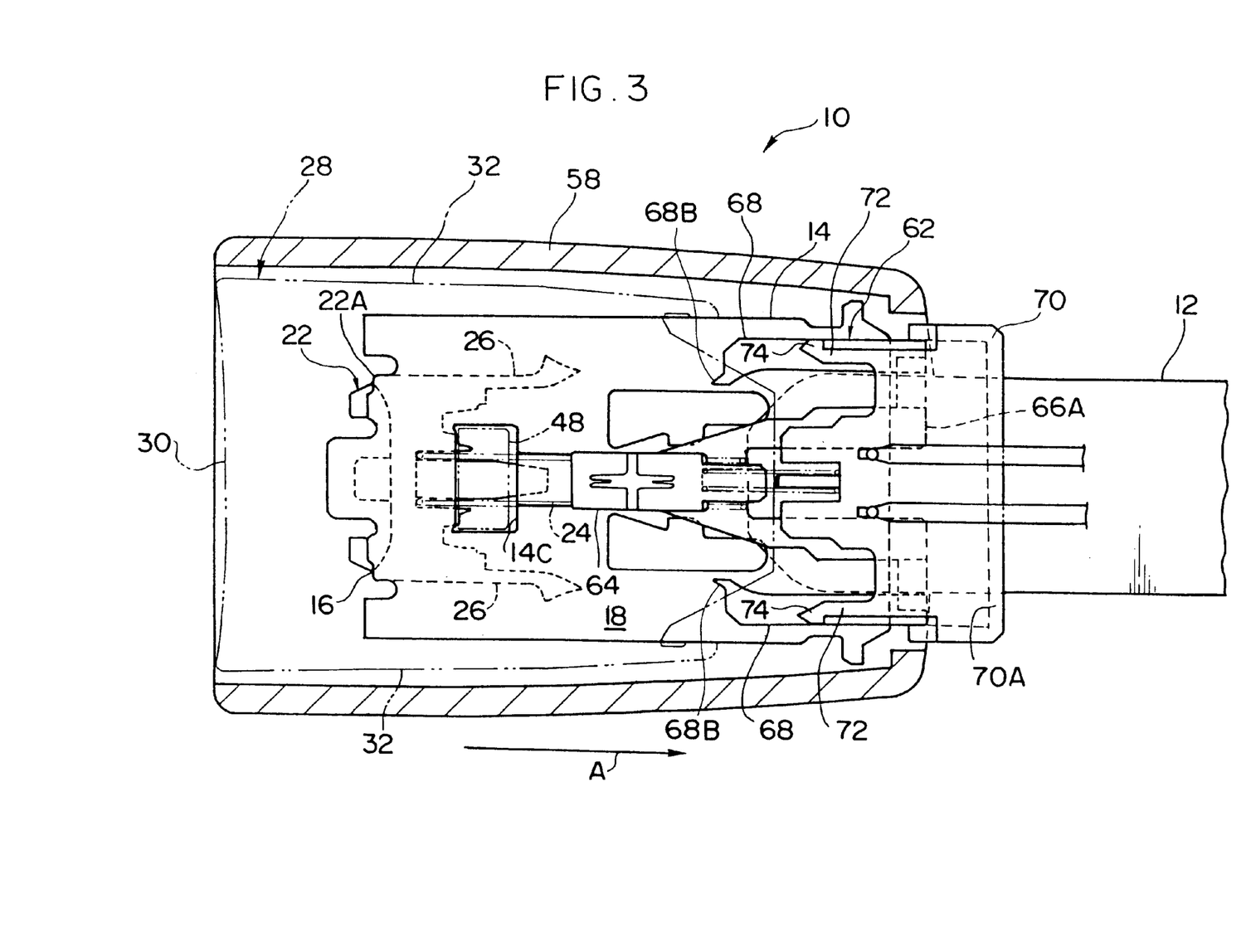
FIG. 3 is a horizontal cross-sectional view that shows a schematic structure of the buckle according to the present embodiment.

FIGS. 1 through 3 show a buckle 10 according to the present embodiment.

The buckle 10 has an anchor plate 14 which is attached by rivets 14D to an attachment piece 12 extended from a vehicle (not shown). The anchor plate 14 is formed by bending an elongated plate member at a longitudinal direction center, and two parallel plates (an upper plate 14A and a lower plate 14B) are formed at a predetermined interval. An insertion hole 16 is formed at the center of one end (a bent portion) of the anchor plate 14, and a tongue plate 20 is inserted through this insertion hole 16 into an insertion portion 18 formed between the upper plate 14A and the lower plate 14B. A through-hole (not illustrated) is formed at the tongue plate 20, and a webbing of a seat belt device is inserted through this through-hole. Further, the attachment piece 12 is inserted from the other end of the anchor plate 14 and fixed.

An ejector 22 is sidably accommodated within the anchor plate 14 in the longitudinal directions (the direction of arrow A and the opposite direction thereof) of the anchor plate 14. An eject spring 24 is disposed between the ejector 22 and the attachment piece 12 so as to urge the ejector 22 toward the insertion hole 16. Corner portions 22A of the ejector 22 abut the anchor plate 14 and sliding of the ejector 22 is restricted to a fixed range.

A pair of corner pieces 26 facing the attachment piece 12 protrude from transverse direction ends of the ejector 22. When the ejector 22 is pressed by the tongue plate 20 and moved toward the attachment piece 12, a projecting portion of the corner piece 26 provided substantially in the longitudinal direction center is formed at a predetermined position so that the projecting portion presses a projection (not shown) provided at a button 28.

This button 28 is attached to the upper plate 14A side of the anchor plate 14. When viewed from above, the button 28 is formed in a substantially rectangular frame-shape, and has a pressing plate 30 for pressing, a pair of parallel outer plates 32 which protrude from the vicinities of the transverse direction end portions of this pressing plate 30, and a pair of parallel inner plates 34 which protrude inward in the transverse direction further than the outer plates 32.

A pawl piece 36 is formed towards the inward direction at each of the outer plates 32. This pawl piece 36 engages with a portion between the upper plate 14A and the lower plate 14B of the anchor plate 14 from the outer side of the anchor plate 14, such that the button 28 cannot be removed from the anchor plate 14 and is slidable in the longitudinal direction of the anchor plate 14.

A projection 38 is provided on each of the inner surfaces of the inner plates 34. Further, a release surface 40, which is gradually inclined towards the pressing plate 30 in a direction of separating from the anchor plate 14, is formed further toward the pressing plate 30 side than the projections 38. In a state in which the tongue plate 20 is not inserted into the insertion portion 18, the projections 38 abut the respective lower surfaces of abutment pieces 50 of a latch 48, which will be described later, and movement of the latch 48 in the engaging direction (the direction of arrow B) is prevented. Moreover, in a state in which the tongue plate 20 is inserted into the insertion portion 18 and the latch 48 engages with an engagement hole 42 of the tongue plate 20 (a locked state), the projections 38 abut the respective upper surfaces of the abutment pieces 50 of the latch 48 and movement of the latch 48 in the engagement releasing direction (the direction opposite the direction of arrow B) is prevented.

When the button 28 moves in the lock releasing direction (the direction of arrow A) in the locked state, the release surface 40 converts this pressing force to a force which moves the latch 48 in the engagement releasing direction (the direction opposite the direction of arrow B) and presses the abutment pieces 50 from the lower surface side. In this way, the latch 48 moves in the engagement releasing direction.

A holding block 44 is disposed upright over the inner plates 34 at a position of the upper plate 14A that is further inward than the outer plates 32 of the button 28. The holding block 44 has a pair of parallel holding plates 46 and the latch 48 is disposed between the holding plates 46. The holding plates 46 prevent movement of the latch 48 in the longitudinal directions (the direction of arrow A and the opposite direction thereof) of the anchor plate 14 and allow movement thereof in the engaging direction and the engagement releasing direction (the direction of arrow B and the opposite direction thereof).

The latch 48 is formed substantially U-shaped, when viewed from front, and the abutment pieces 50 respectively extend from the upper ends thereof outwardly in the transverse direction. Further, an engaging piece 52 extends toward the tongue plate 20 from the transverse direction center of the latch 48. When the tongue plate 20 is inserted into the insertion portion 18 up to a predetermined position, the engaging piece 52 penetrates through a through-hole 14C formed at the upper plate 14A of the anchor plate 14, engages with the engagement hole 42 of the tongue plate 20, and further penetrates through a through-hole (not shown) formed at the lower plate 14B.

A pair of plate spring pieces 76 protrude from the holding block 44 toward the pressing plate 30 of the button 28 and urge the button 28 in the direction opposite the direction of arrow A. In this way, when the pressing plate 30 is pressed, appropriate resistance is generated.

One end of a plate spring-shaped lock spring 54 is attached to the button 28. Another end of the lock spring 54 abuts the upper surface of the latch 48 and urges the latch 48 in the engaging direction (the direction of arrow B).

A buckle main body 56 is formed by the anchor plate 14, the ejector 22, the button 28, the eject spring 24, the holding block 44, the latch 48, and the lock spring 54, which are described above.

Figure 4:
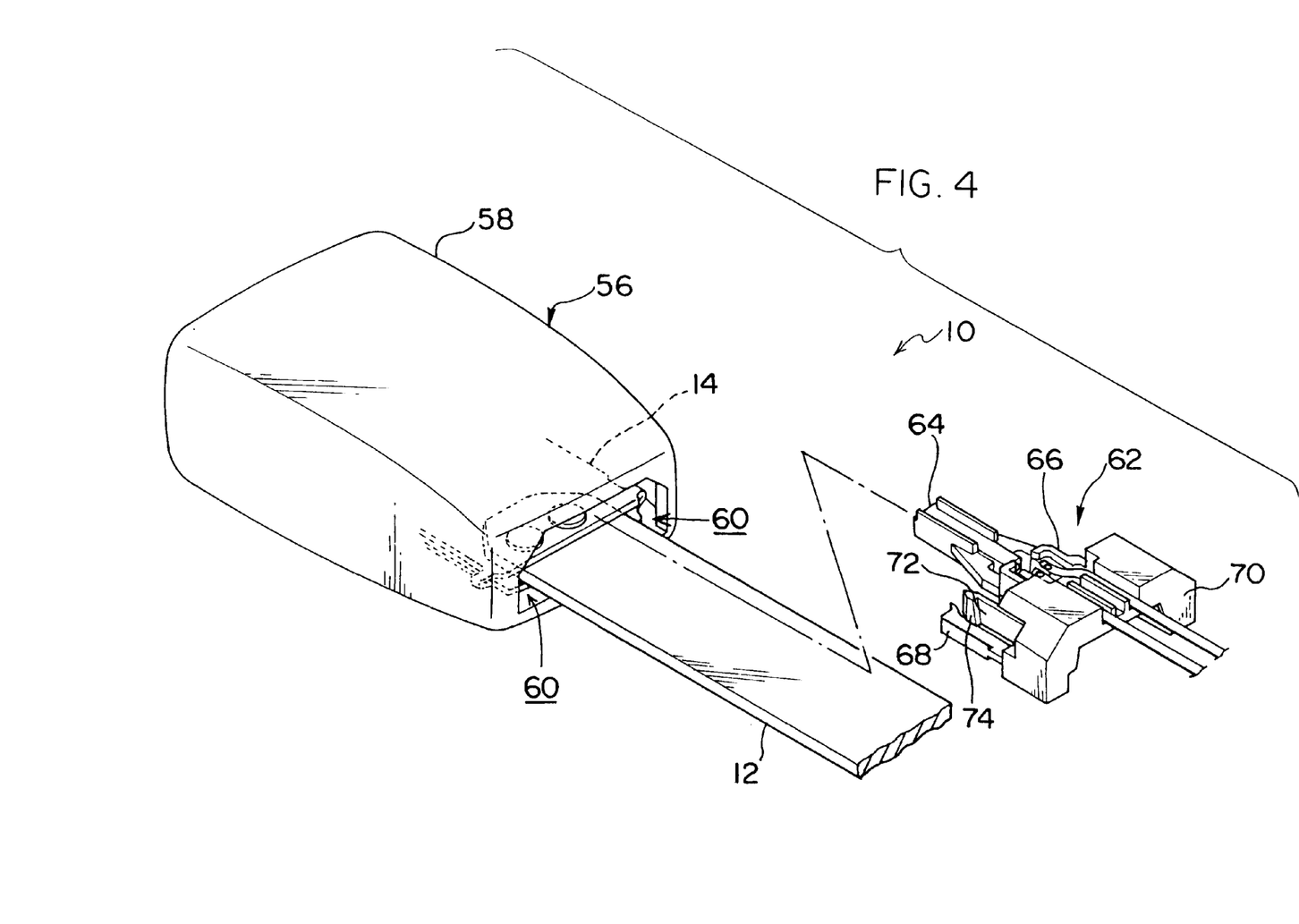
FIG. 4 is a perspective view that shows a state in which a switch is separated from the buckle according to the present embodiment.

The cover 58 is attached to this buckle main body 56 and covers the anchor plate 14, the ejector 22, the button 28, the eject spring 24, the holding block 44, the latch 48, and the lock spring 54. The cover 58 is formed substantially rectangular pipe-shaped and has opened longitudinal direction ends. The cover 58 contains the attachment piece 12 from the outer end side thereof and is slid. A fixing projection (not illustrated) of the anchor plate 14 engages with the cover 58 at a position that covers the buckle main body 56. The cover 58 is thereby made so that it does not slip off. In this state, predetermined clearances 60 (see FIGS. 4 and 5) are formed between the cover 58 and the attachment piece 12.

A switch 62 is attached to substantially in the transverse direction center of the upper plate 14A of the anchor plate 14. As shown in FIGS. 4 through 7, the switch 62 is fixed to the anchor plate 14 and includes a sliding portion (not illustrated) in an internal position. The switch 62 includes a switch main body 64 which is turned on/off by sliding this sliding portion and a slider 66 which slides the sliding portion of this switch main body 64. The slider 66 is urged in the direction opposite the direction of arrow A by an unillustrated slider spring.

The slider 66 is formed substantially W-shaped, when viewed from above, with a material having a predetermined elasticity, such as a resin or the like. A central portion of the slider 66 abuts the sliding portion of the switch main body 64 and slides the sliding portion.

Figure 5:
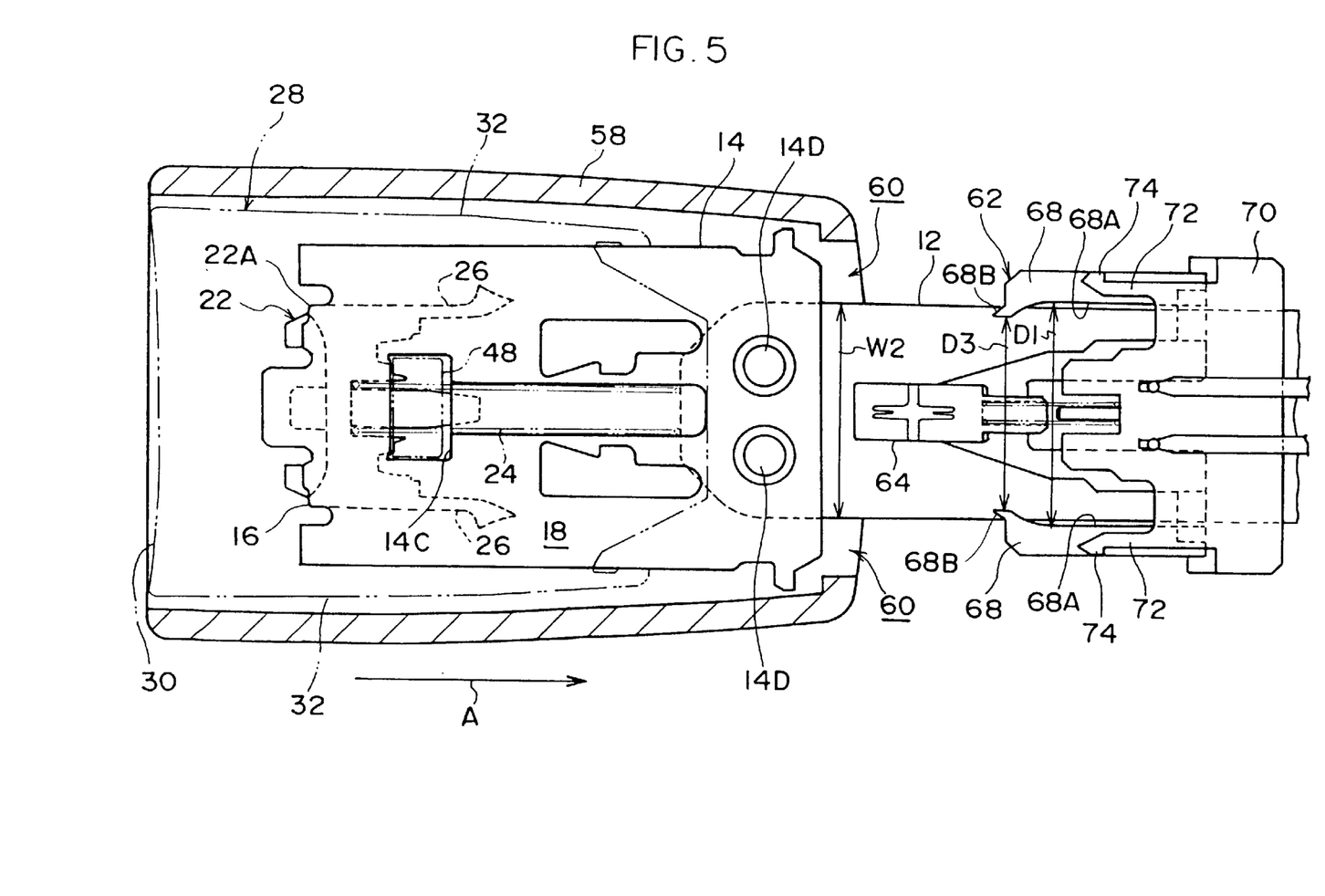
FIG. 5 is horizontal cross-sectional view that shows a process of attaching the switch to the buckle according to the present embodiment.

A pair of wing portions 68 formed at the transverse direction ends of the slider 66, respectively, extend in parallel toward the one end of the anchor plate 14. As shown in FIG. 5, an interval D1 between opposing surfaces 68A of the wing portions 68 is substantially equal to or larger than a width W2 of the attachment piece 12. Moreover, the vicinities of the distal ends of the wing portions 68 are curved in the shape of an arc so that the opposing surfaces 68A gradually face an inward surface, i.e., gradually approach each other. An interval D3 is narrower than the width W2 of the attachment piece 12. Accordingly in a state in which the cover 58 is attached to the buckle main body 56, the wing portions 68 are elastically extended outwardly and inserted into a portion between the upper plate 14A and the lower plate 14B, and the switch 62 can be inserted into the cover 58 through the clearances 60.

Further, the wing portions 68 elastically return to their original shapes after the insertion of the switch 62. At this time, the configurations of the wing portions 68 are determined so that distal end surfaces 68B of the wing portions 68 oppose the distal ends of the corner pieces 26 of the ejector 22 (see FIG. 3). Accordingly, when the ejector 22 slides in the direction of arrow A, the distal ends of the corner pieces 26 press the distal end surfaces 68B of the wing portions 68 and the slider 66 also slides in the direction of arrow A. In this way, the sliding portion of the switch main body 64 also slides and the switch 62 is turned on.

As shown in FIG. 3, in a state in which the switch 62 is inserted into the cover 58 and attached to the anchor plate 14, the clearances 60 are closed by a holder 70. A pair of engaging pieces 72 protrude from the transverse direction ends of the holder 70. An engaging projection 74 which is formed at each of the distal ends of this engaging pieces 72 engages with the engagement hole (not illustrated) formed at the cover 58, and the holder 70 is fixed to the cover 58. In the fixed state, a predetermined clearance is formed between a rear end 66A of the slider 66 and a rear wall 70A of the holder 70. Thus, sliding of the slider 66 is permitted while being restricted to a predetermined range.

Next, operations of the buckle 10, the switch 62, and a method of manufacturing the buckle 10 in accordance with the present embodiment will be explained.

First, the anchor plate 14 is formed by bending the plate member substantially at a predetermined center position. Then, the ejector 22 is accommodated between the upper plate 14A and the lower plate 14B of the anchor plate 14 and the eject spring 24 is attached therebetween. In this state, a part of the attachment piece 12 is inserted between the upper plate 14A and the lower plate 14B and the attachment piece 12 and the anchor plate 14 are fixed by the rivets 14D.

Next, the button 28, the holding block 44, the latch 48, and the lock spring 54 are assembled on the upper plate 14A of the anchor plate 14. In this way, the buckle main body 56 is formed.

Then, the attachment piece 12 is inserted into the cover 58 and the cover 58 is attached. The anchor plate 14, the slider 66, the button 28, the eject spring 24, the holding block 44, the latch 48, and the lock spring 54 are covered by the cover 58. If the buckle does not require the switch 62, the buckle is completed in this state.

Figure 6:
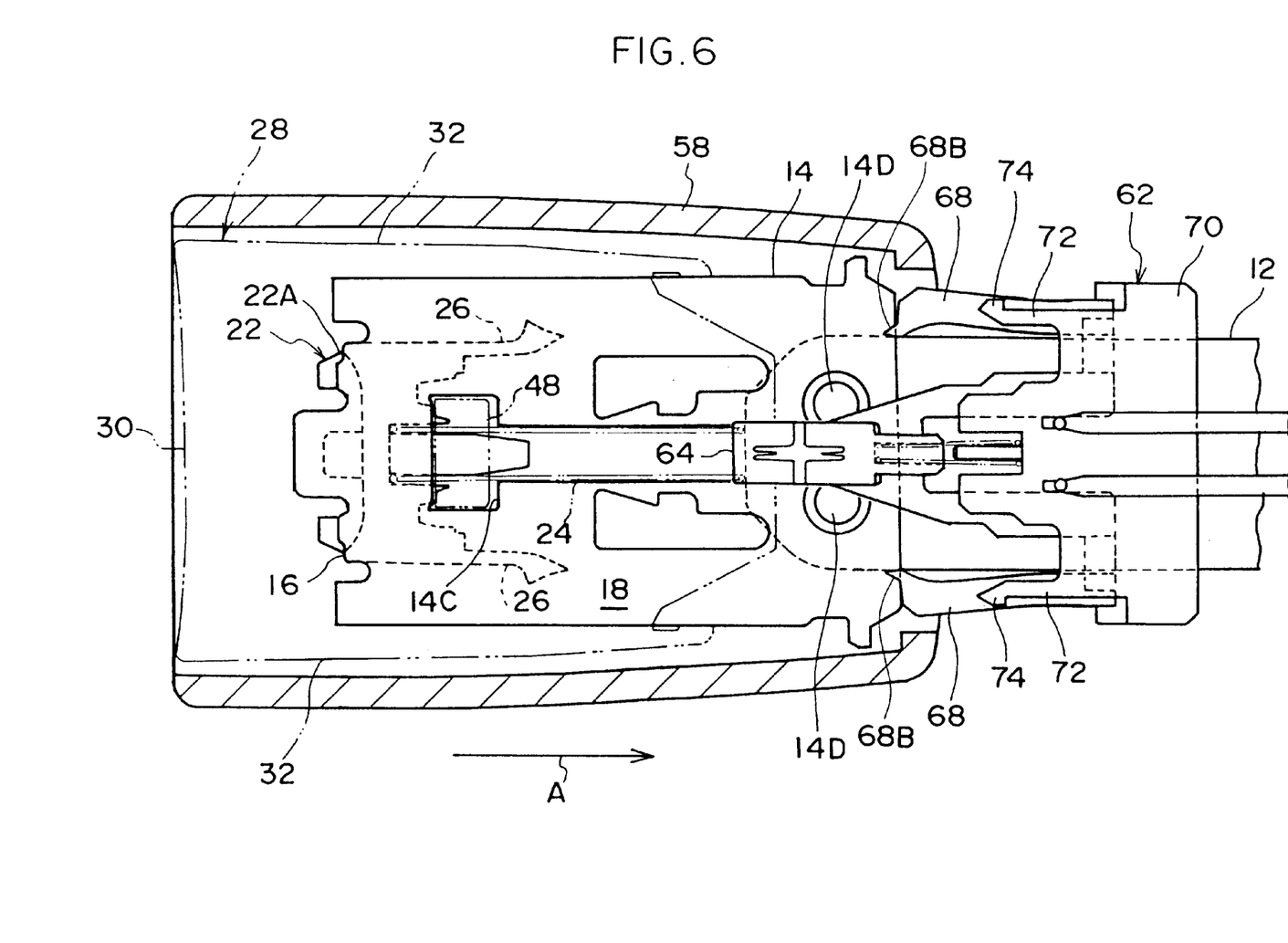
FIG. 6 is a horizontal cross-sectional view that shows the process of attaching the switch to the buckle according to the present embodiment.

As shown in FIG. 6, in order to attach the switch 62, the wing portions 68 are deflected outwardly so that the interval therebetween is increased and are disposed at the exterior of the attachment piece 12. Then, while this state is maintained, the switch 62 is inserted into the cover 58 through the clearances 60 and attached to the anchor plate 14.

Figure 7:
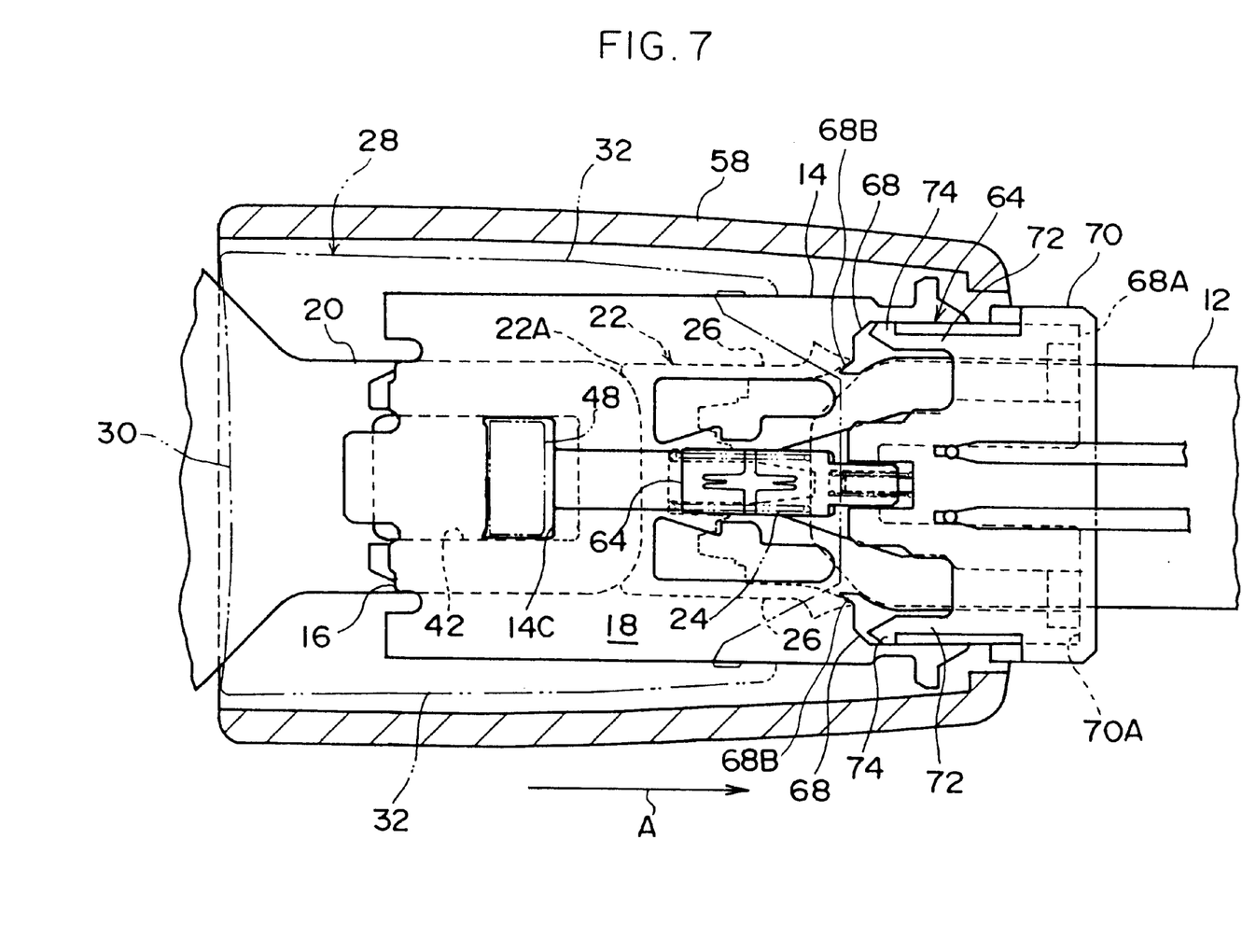
FIG. 7 is a horizontal cross-sectional view that shows a state in which a tongue plate is inserted into the buckle according to the present embodiment.

After the insertion, the wing portions 68 elastically return to their original shapes, and the distal end surfaces 68B of the wing portions 68 oppose the distal ends of the corner pieces 26 of the ejector 22. As a result, as shown in FIG. 7, when the tongue plate 20 is inserted into the inserting portion 18 and the ejector 22 is pressed by the tongue plate 20 and slides in the direction of arrow A in resistance to the urging force of the eject spring 24, the distal ends of the corner pieces 26 press the distal end surfaces 68B of the wing portions 68 and the slider 66 also slides in the direction of arrow A. In this way, the sliding portion of the switch main body 64 also slides and the switch 62 is turned on. Moreover, because the corner pieces 26 press the unillustrated projection that protrudes from the button 28, the button 28 moves in the direction of arrow A and the projection 38 separates from the abutment pieces 50 of the latch 48. As a result, the latch 48 moves in the engaging direction (the direction of arrow B) due to the urging force of the lock spring 54 and engages with the engagement hole 42 of the tongue plate 20. Thus, the tongue plate 20 is locked and cannot be removed from the buckle 10.

As described above, since the wing portions 68 elastically return to their original shapes and the distal end surfaces 68B of the wing portions 68 oppose the distal ends of the corner pieces 26 of the ejector 22, there is no need to provide separately a portion pressed by the corner pieces 26 at the slider 66. As a result, the structure of the slider 66 is not complicated and the cost of manufacturing is reduced.

When the pressing plate 30 of the button 28 is pressed and the button 28 is slid in the lock releasing direction (the direction of arrow A), the latch 48 moves upwardly in resistance to the urging force of the lock spring 54 and is removed from the engagement hole 42 of the tongue plate 20. The tongue plate 20 receives urging force of the eject spring 24 via the ejector 22 and is removed from the inserting portion 18. In this way, the slider 66 also moves in the direction opposite the direction of arrow A and the switch main body 64 is turned off.

Accordingly, the switch 62 relating to the present embodiment is inserted into the cover 58 through the clearances 60 by elastically deforming the wing portions 68 and is attached to the tongue plate 20. Thus, the process of manufacturing the buckle 10 can be simplified and the cost of manufacturing can be reduced.

Further, until the switch 62 is attached, the buckle can be manufactured using the same manufacturing method as that of the buckle at which the switch 62 is not provided. Therefore, a manufacturing line can be used in common and the cost of manufacturing the buckle 10 can be reduced.

In the above description, an example of a case in which the slider is substantially W-shaped is described. However, the configuration of the slider is not limited to the same and, in short, any configuration may be possible provided that the slider is attached to the buckle main body 56 and turns on the switch main body 64 when the tongue plate 20 is inserted. Further, the elastic portions of the present invention are not limited to the wing portions 68. For example, depending on the relationship between the wing portions 68 and the clearances 60, the elastic portion may have a structure in which the wing portions 68 elastically deform outwardly, upwardly, or downwardly and the switch 62 can be inserted thereinto.

What is claimed is:

1. A switch for a buckle which is disposed at a buckle main body and which is turned on when a tongue plate is inserted into the buckle, wherein a cover body is attached to the buckle main body, the switch comprising:
   a switch main body; and
   a slider movably provided on the switch main body, the slider having an elastic portion and which as the switch main body is inserted in the buckle main body and the cover body the elastic portion flexes due to elastic deformation, thereby allowing insertion of said switch main body into the buckle.

2. A switch for a buckle according to claim 1, wherein, when said switch main body is inserted into the buckle, said elastic portion elastically returns to an original shape at a position at which said elastic portion is pressed by a tongue plate inserted into the buckle.

3. A switch for a buckle according to claim 1, wherein the elastic portion elastically deflects outward as the elastic portion is inserted into the buckle main body and cover body.

4. A switch for a buckle according to claim 3, wherein said elastic portion elastically returns to an original shape at a position within the buckle at which said elastic portion is pressed by a tongue plate, and wherein said switch is turned on when a tongue plate is inserted into the buckle.

5. A switch for a buckle according to claim 3, wherein said elastic portion is formed at said slider.

6. A switch for a buckle according to claim 1, wherein the switch main body includes opposite sides, a pair of elastic portions provided at one side of said switch main body.

7. A switch for a buckle according to claim 6, wherein said elastic portion is formed at said slider.

8. A buckle according to claim 6, further comprising another pair of elastic portions provided opposite the first pair of elastic portions.

9. A buckle for insertion of a tongue plate therein, the buckle comprising:
   a buckle main body into which a tongue plate can be inserted, said buckle main body being adapted to engage with the inserted tongue plate and preventing removal of the tongue plate;
   a cover body that is attached to said buckle main body and covers at least a portion of said buckle main body;
   a switch main body that is disposed at said buckle main body and is turned on when the tongue plate is inserted into said buckle main body; and
   a slider movably provided on the switch main body, the slider having an elastic portion which is provided at said switch main body and when said elastic portion is inserted into said buckle through at least one clearance formed between said buckle main body and said cover body, said elastic portion elastically deforms thereby allowing insertion of the switch main body into said buckle main body.

10. A buckle according to claim 9, wherein the elastic portion elastically deflects outward as the elastic portion is inserted into the buckle main body and cover body.

11. A buckle according to claim 10, wherein said elastic portion is formed at said slider.

12. A buckle according to claim 10, wherein, when said elastic portion elastically returns to an original shape at a position in the buckle at which said elastic portion is pressed by a tongue plate inserted within the buckle, the slider slides and activates said switch.

13. A buckle according to claim 9, wherein the switch main body includes opposite sides, a pair of elastic portions provided on each side of the switch.

14. A buckle for insertion of a tongue plate therein, the buckle comprising:
   a buckle main body into which a tongue plate can be inserted, said buckle main body being adapted to engage with the inserted tongue plate and preventing removal of the tongue plate;
   a cover body that is attached to said buckle main body and covers at least a portion of said buckle main body;
   a switch main body that is disposed at said buckle main body and is turned on when the tongue plate is inserted into said buckle main body; and
   an elastic portion which is provided at said switch main body and which, due to elastic deformation, allows insertion of said switch main body into said buckle from clearances formed between said buckle main body and said cover body, wherein, when said switch main body is inserted into said buckle, said elastic portion elastically returns to an original shape at a position at which said elastic portion is pressed by a tongue plate when a tongue plate is inserted into said buckle.

15. A buckle according to claim 14, wherein a slider is movably mounted on the switch main body, with said elastic portion extending from said slider.

16. A buckle according to claim 14, wherein said elastic portion is formed at said slider.

17. A method of manufacturing a buckle, comprising the steps of:

assembling a buckle main body on a supporting plate into which a tongue plate can be inserted, the buckle main body including buckle components which engage with an inserted tongue plate and prevent removal of the tongue plate;

attaching a cover body to the supporting plate, which covers the buckle components; and attaching a switch having a slider movably provided on the switch, the slider having at least a portion that can be elastically deformed, which is elastically deformed as it is inserted into at least one clearance formed between the supporting plate and the cover body when attaching the switch to the supporting plate.

18. A method of manufacturing a buckle according to claim 17, wherein the switch main body includes opposite sides, further comprising the step of providing at least two portions at one side of the switch main body that can be elastically deformed.

19. A method of manufacturing a buckle according to claim 17, wherein a slider is provided at the switch main body for activating the switch.

20. A method of manufacturing a buckle, comprising the steps of:

assembling a buckle main body on a supporting plate into which a tongue plate can be inserted, the buckle main body including buckle components which engage with an inserted tongue plate and prevent removal of the tongue plate;

attaching a cover body to the supporting plate, which covers the buckle components; and attaching a switch having at least a portion that can be elastically deformed, which is deformed and inserted through clearances formed between the supporting plate and the cover body when attaching the switch to the supporting plate, wherein, when the switch main body is inserted into the buckle, the switch for a buckle which can be elastically deformed elastically returns to an original shape at a position at which the switch is pressed by a tongue plate inserted into said buckle main body.

* * * * *